(12) United States Patent
Weverka et al.

(10) Patent No.: US 11,916,598 B2
(45) Date of Patent: Feb. 27, 2024

(54) PARALLEL OPTICAL COMMUNICATION CHANNELS USING MICROLEDS

(71) Applicant: AvicenaTech Corp., Sunnyvale, CA (US)

(72) Inventors: Robert T. Weverka, Mountain View, CA (US); Robert Kalman, Mountain View, CA (US); Bardia Pezeshki, Mountain View, CA (US); Alexander Tselikov, Mountain View, CA (US); Cameron Danesh, Mountain View, CA (US)

(73) Assignee: AvicenaTech Corp., Sunnyvale, CA (US)

( * ) Notice: Subject to any disclaimer, the term of this patent is extended or adjusted under 35 U.S.C. 154(b) by 0 days.

(21) Appl. No.: 17/229,510

(22) Filed: Apr. 13, 2021

(65) Prior Publication Data

US 2021/0320721 A1 Oct. 14, 2021

Related U.S. Application Data

(60) Provisional application No. 63/009,140, filed on Apr. 13, 2020.

(51) Int. Cl.
| | | |
|---|---|---|
| *H04B 10/50* | (2013.01) | |
| *H04B 10/25* | (2013.01) | |
| *G02B 6/02* | (2006.01) | |
| *G02B 6/42* | (2006.01) | |
| *H04B 10/2581* | (2013.01) | |

(52) U.S. Cl.
CPC ........... *H04B 10/502* (2013.01); *H04B 10/25* (2013.01); *G02B 6/02042* (2013.01); *G02B 6/42* (2013.01); *H04B 10/2581* (2013.01); *H04B 10/50* (2013.01)

(58) Field of Classification Search
CPC .. H04B 10/502; H04B 10/25; H04B 10/2581; H04B 10/50; H04B 10/803; G02B 6/02042; G02B 6/42
USPC .................................. 398/140–172, 182–201
See application file for complete search history.

(56) References Cited

U.S. PATENT DOCUMENTS

| | | | |
|---|---|---|---|
| 5,117,473 A * | 5/1992 | Pan ........................... | G02B 6/32 385/33 |
| 5,335,361 A | 8/1994 | Ghaem | |
| 5,365,374 A * | 11/1994 | Nishikawa ......... | B23K 26/0676 385/33 |
| 5,638,469 A | 6/1997 | Feldman et al. | |
| 5,848,214 A | 12/1998 | Haas et al. | |
| 6,160,943 A * | 12/2000 | Davis ..................... | G02B 6/262 385/39 |
| 7,459,726 B2 | 12/2008 | Kato et al. | |

(Continued)

FOREIGN PATENT DOCUMENTS

JP 2011-014932 A 1/2011

OTHER PUBLICATIONS

Rosinski et al., Multichannel Transmission of a Multicore Fiber Coupled with Vertical Cavity Surface Emitting, May 1999, JLT, All Document. (Year: 1999).*

(Continued)

*Primary Examiner* — Dibson J Sanchez
(74) *Attorney, Agent, or Firm* — KOS IP Law LLP

(57) ABSTRACT

Coupling of light from large angular distribution microLEDs into smaller angular acceptance distribution of transmission channels is performed using optical elements.

5 Claims, 8 Drawing Sheets

(56) References Cited

U.S. PATENT DOCUMENTS

| | | | |
|---|---|---|---|
| 7,548,674 B1* | 6/2009 | Horibe | G02B 6/4249 385/52 |
| 7,915,699 B2 | 3/2011 | Krishnamoorthy et al. | |
| 8,148,202 B2 | 4/2012 | Krishnamoorthy et al. | |
| 10,177,872 B1* | 1/2019 | Wang | H04J 14/06 |
| 10,234,632 B1* | 3/2019 | Keeler | G02B 6/4206 |
| 10,236,952 B1* | 3/2019 | Sadot | H04B 7/0426 |
| 2004/0076197 A1* | 4/2004 | Clarkson | H01S 3/06708 372/6 |
| 2004/0159777 A1 | 8/2004 | Stone | |
| 2006/0034572 A1* | 2/2006 | Morris | G02B 6/04 385/115 |
| 2007/0057163 A1* | 3/2007 | Ishigami | G02B 6/4249 250/216 |
| 2009/0040781 A1* | 2/2009 | Ito | A61B 1/0653 362/554 |
| 2009/0180734 A1* | 7/2009 | Fiorentino | G02B 6/43 385/31 |
| 2009/0180743 A1* | 7/2009 | Althaus | H04B 10/2589 385/101 |
| 2009/0237955 A1* | 9/2009 | Mukai | H01S 5/02212 372/5 |
| 2011/0176776 A1* | 7/2011 | Imamura | G02B 6/02042 385/59 |
| 2011/0280517 A1* | 11/2011 | Fini | G02B 6/262 385/43 |
| 2012/0155806 A1* | 6/2012 | Doerr | G02B 6/43 427/163.2 |
| 2012/0183304 A1* | 7/2012 | Winzer | H04B 10/2581 398/142 |
| 2012/0251045 A1* | 10/2012 | Budd | G02B 13/22 385/33 |
| 2013/0163935 A1* | 6/2013 | Sasaki | G02B 6/36 385/77 |
| 2014/0199037 A1* | 7/2014 | Hurley | G02B 6/4403 385/114 |
| 2015/0325746 A1* | 11/2015 | Percival | H01L 33/16 438/39 |
| 2015/0341113 A1* | 11/2015 | Krug | H04B 10/1149 398/118 |
| 2016/0020353 A1 | 1/2016 | Chu | |
| 2016/0062028 A1* | 3/2016 | Aoki | G02B 6/0078 362/613 |
| 2016/0172020 A1 | 6/2016 | Baker et al. | |
| 2016/0223774 A1* | 8/2016 | Bennett | C03C 25/12 |
| 2016/0233269 A1 | 8/2016 | Choi et al. | |
| 2016/0246015 A1* | 8/2016 | Case | G02B 6/4206 |
| 2017/0276874 A1 | 9/2017 | Kashyap et al. | |
| 2019/0049367 A1 | 2/2019 | Zou | |
| 2019/0189603 A1 | 6/2019 | Wang et al. | |
| 2020/0379168 A1* | 12/2020 | Mukasa | C03B 37/01222 |
| 2021/0035708 A1* | 2/2021 | Oro | H01B 7/0081 |
| 2021/0208337 A1* | 7/2021 | Pezeshki | G02B 6/43 |
| 2021/0286140 A1* | 9/2021 | Winzer | G02B 6/4214 |
| 2021/0396927 A1* | 12/2021 | Harker | G01M 11/33 |

OTHER PUBLICATIONS

CMOG, What is glass, Dec. 2011, All Document. https://www.cmog.org/article/what-is-glass (Year: 2011).*

Yurii Vlasov, Silicon photonics for next generation computing systems, Tutorial given at the European Conference on Optical Communications, Sep. 22, 2008.

J. F. C. Carreira et al., Direct integration of micro-LEDs and a SPAD detector on a silicon CMOSchip for data communications and time-of-flight ranging, Optics Express, vol. 28, No. 5, Mar. 2, 2020, pp. 6909-6917.

Martin D. Dawson, Micro-LEDs for Technological Convergence between Displays, OpticalCommunications, & Sensing and Imaging Systems, SID Display Week 2020, Session 44, Invited paper No. 44.1, 27 pages.

Lars Brusberg et al., Optoelectronic Glass Substrate for Co-packaged Optics and ASICs, Optical Fiber Communication Conference, Mar. 12, 2020, San Diego, CA, pp. 1-24.

Roger Dangel et al., Polymer Waveguides Enabling Scalable Low-Loss Adiabatic Optical Couplingfor Silicon Photonics, IEEE Journal of Selected Topics In Quantum Electronics, vol. 24, No. 4, Jul./Aug. 2018, 11 pages.

Ziyang Zhang et al., Hybrid Photonic Integration on a Polymer Platform, Photonics 2015, 2, pp. 1005-1026.

David A. B. Miller, Optical Interconnects, IAA Workshop, Jul. 22, 2008, pp. 1-26.

Brian Corbett et al., Chapter Three—Transfer Printing for Silicon Photonics, Semiconductors andSemimetals, vol. 99, 2018, ISSN 0080-8784, pp. 43-70, https://doi.org/10.1016/bs.semsem.2018.08.001.

Bing Wang et al., On-chip Optical Interconnects using InGaN Light-Emitting Diodes Integrated with Si-CMOS, In: Aais Communications and Photonics Conference 2014, Shanghai, China, Nov. 11-14, 2014, pp. 1-3.

Lei Liu et al., On-chip optical interconnect on silicon by transfer printing, In: CLEO: Science and Innovations 2018, San Jose, California, USA, May 13-18, 2018, pp. 1-2.

* cited by examiner

PARALLEL OPTICAL COMMUNICATION CHANNELS USING MICROLEDS

CROSS REFERENCE TO RELATED APPLICATION

This application claims the benefit of the filing date of U.S. Provisional Patent Application No. 63/009,140, filed on Apr. 13, 2020, the disclosure of which is incorporated by reference herein.

FIELD OF THE INVENTION

The present invention relates generally to optical communication systems, and more generally to parallel optical communication channels in optical communication systems using microLEDs.

BACKGROUND OF THE INVENTION

ICs have traditionally been connected by traces on printed circuit boards (PCBs). However, the required IC packaging and coarse PCB linewidth severely limits IC and interconnect density. More recently, ICs have been interconnected using silicon and organic interposers where bare IC dies are connected by thin electrical lines of the interposers. These interposers enable far higher IC and interconnect densities than PCBs, but still impose significant limitations. For example:

Interconnect lengths are typically limited to <1 cm by ohmic losses and the energy required to charge the capacitance of longer lines. This, in turn, typically limits connections to nearest-neighbor ICs.

Even for connections that are only a few mm in length, drive power for chip-to-chip connections can become significant and constrain systems based on power dissipation.

The use of planar substrates for interposers may significantly limit IC density, interconnect density and topologies, and power dissipation.

BRIEF SUMMARY OF THE INVENTION

Some embodiments provide optical interconnects based on microLED sources. A microLED may be generally defined as a LED with a diameter of <100 um and can be made with diameters <20 um or <1 um. In some embodiments they can support optical links with lengths of >1 m at >1 Gbps with low power consumption and very high density.

Some embodiments provide end to end transfer of light from the microLEDs to the detectors with a high efficiency optical link, whether that communication link comprises, or consists of in some embodiments waveguides, free-space, or some combination of the two.

Some embodiments provide optical communication apparatus for an optically interconnected integrated circuit which includes circuitry for performing logic functions, comprising: an array of microLEDs; optical transmission channels to receive light from the array of microLEDs at optical transmission channel inputs; and optical elements, including at least one lens, between the array of microLEDs and the optical transmission channel inputs to magnify and focus light from the array of microLEDs onto the optical transmission channel inputs.

These and other aspects of the invention are more fully comprehended upon review of this disclosure.

DETAILED DESCRIPTION

A microLED is made from a p-n junction of a direct-bandgap semiconductor material. A microLED is distinguished from a semiconductor laser (SL) in the following ways: (1) a microLED does not have an optical resonator structure; (2) the optical output from a microLED is almost completely spontaneous emission whereas the output from a SL is dominantly stimulated emission; (3) the optical output from a microLED is temporally and spatially incoherent whereas the output from a SL has significant temporal and spatial coherence; (4) a microLED is usually designed to be operated down to a zero minimum current, whereas a SL is designed to be operated above a minimum threshold current, which is typically at least 1 mA.

A microLED may be distinguished from a standard LED by having an emitting region of less than 20 μm×20 μm. MicroLEDs generally have small etendue, allowing them to be efficiently coupled into small waveguides and/or imaged onto small photodetectors. For convenience, the following discussion will generally mention LEDs. It should be recognized, however, that the discussion pertains to microLEDs, which may be considered a particular type of LED.

LEDs emit in a Lambertian pattern; light is emitted into a full half-sphere of $2\pi$ steradians. This wide angular spectrum is poorly matched to the limited numerical aperture (NA) of a waveguide. A challenge of coupling a microLED to a small waveguide is to address this NA mismatch.

The product of the spatial and angular aperture of an LED is captured in its etendue. The etendue of an LED generally cannot be reduced; generally it can only be preserved or increased. This implies, for instance, that the coupling from an LED to a single-mode waveguide is very low, since a single-mode waveguide has a very low etendue.

Some embodiments couple light from a microLED transmitter array to an array of transmission channels, preferably with low loss. Each microLED in the transmitter array emits light into a wide angular distribution. By contrast, each transmission channel typically accepts and carries a much smaller angular distribution; the angular acceptance range of an optical channel is often expressed as its numerical aperture (NA).

Some embodiments use one or more methods or techniques to efficiently couple the light from the large angular distribution of the microLED to the smaller angular acceptance distribution of the transmission channel. Some embodiments utilize an optical system that magnifies the image of the entire microLED array onto the input of the transmission channels, increasing the image size of each microLED while reducing its angular range. Other embodiments magnify the emission area from each microLED separately. In some embodiments these methods may be employed separately in a light coupling system, while in some embodiments they may both be used together.

Figure 1:
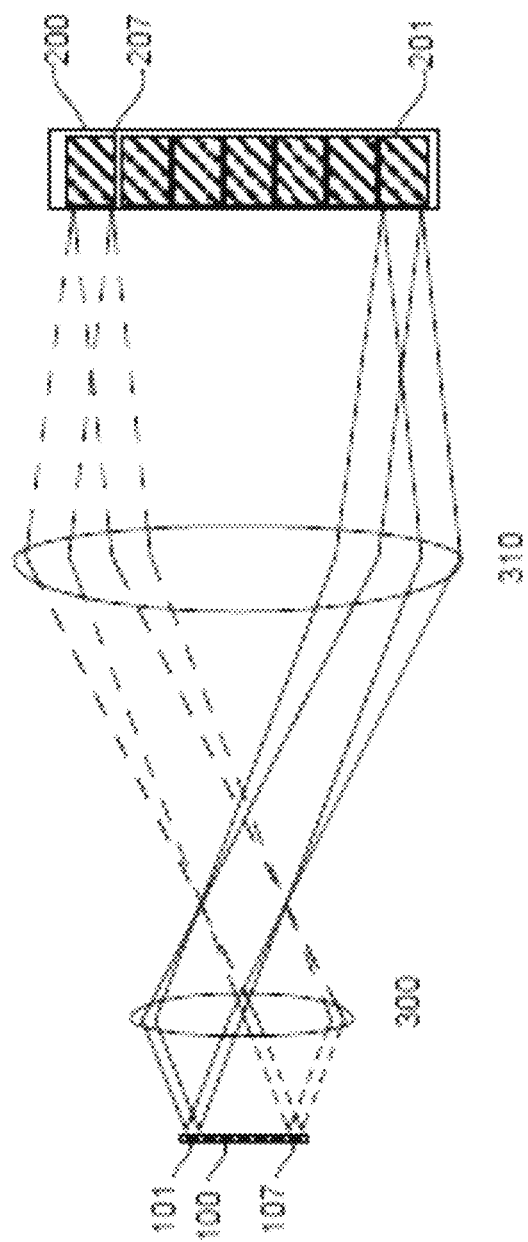
FIG. 1 shows a magnifying system that expands the light from emitters to optical transmission channels and reduces the angular range of the light in each channel.

FIG. 1 shows a magnifying system that expands the light from emitters to optical transmission channels and reduces the angular range of the light in each channel. A first lens 300 collimates light from a microLED transmitter array 100. A longer focal length lens 310 focuses the collimated light onto optical transmission channel inputs 200. FIG. 1 also shows the rays as solid lines coupling light from emitter element 101 of the microLED transmitter array to optical transmission channel input 201 of the transmission channel inputs. Similarly, optical rays coupling emitter element 107 of the microLED transmitter array to transmission channel input 207 of the transmission channel inputs are shown as dashed lines. The magnifying system also couples light from the intermediate microLEDs of the transmission channel inputs to intermediate optical channels of the microLED transmitter array.

The rays shown represent an angular bundle of rays from the edges of the emitter element imaged onto the edges of the transmission channel. Rays from the center regions of the emitter element travel in similar paths.

Figure 2:
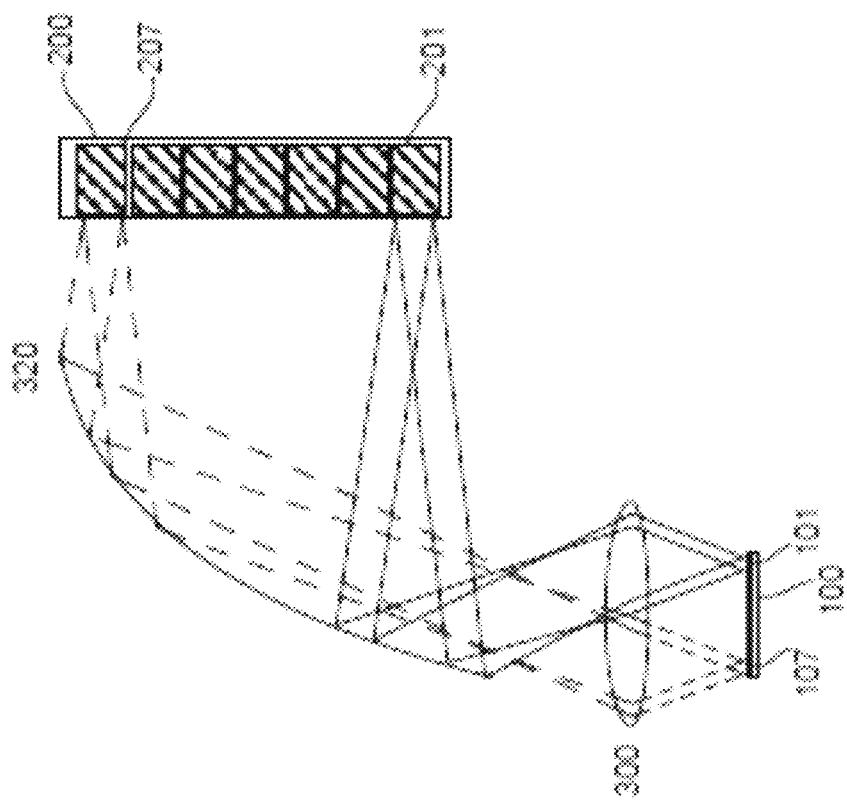
FIG. 2 shows a system for carrying light from a microLED transmitter array to optical transmission channel inputs, with the system including a folding mirror.

FIG. 2 shows a system for carrying light from the microLED transmitter array, 100 to the optical transmission channel inputs 200, with the system including a folding mirror 320. In system of FIG. 2 the folding mirror is curved and replaces the second lens 310 of FIG. 1. In FIG. 2 light from the emitters of the microLED transmitter array is collimated by the first lens 300, with the collimated light reflected by the folding mirror to the optical transmission channel inputs 200. The curved folding mirror serves both to refocus the light onto the optical transmission channel inputs 200 as well as fold the optical train by 90° to couple light from the microLEDs, that are shown as emitting light vertically to the optical transmission channels, that are shown as transmitting the light horizontally.

Instead of replacing one of the lenses in FIG. 1 with a curved mirror, in some embodiments a planar mirror is placed between the two lenses of FIG. 1 to fold light of the system. The simple lenses shown in FIGS. 1 and 2 could also be compound lenses with a number of powered surfaces. In general, any imaging system that magnifies the image of the microLED array also reduces the range of angles incident on the optical channel array, enabling low loss coupling to an optical channel array that has a limited input optical acceptance angle.

In some embodiments the individual microLEDs in an array may each have light collection optics which transmit the emission preferentially towards one direction for further transmission in an optical channel. These light collection optics can be imaging lenses, parabolic reflectors, or non-imaging devices such as described in U.S. Pat. Nos. 5,271,077, 4,257,672 and 4,767,172, the disclosures of which are incorporated by reference herein. In some embodiments the design of non-imaging light collection systems may be optimized for collecting light into uniform optical channels such as step index multimode fiber cores or for optical channels whose angular acceptance depends on position, such as graded index fiber cores.

Figure 3:
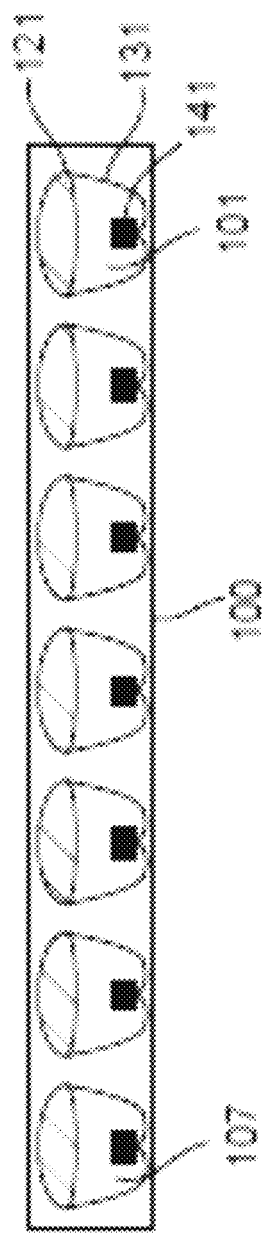
FIG. 3 shows an example of an emitter array with light collection optics for each microLED in the array.

FIG. 3 shows an example of the emitter array with light collection optics for each microLED in the array. The emitter array 100 has an emitter element 101 comprising microLED 141 for emitting light. The light from the microLED may be directed by a reflector 131, and the light, reflected and non-reflected, may be directed by a lens 121. The reflector may be a parabolic or imaging reflective optic, or the reflector may be a non-imaging optic designed for improving coupling to a spatially dependent acceptance angle of a subsequent optical channel in the system. The function of the reflector 131, in various embodiments, can be accomplished with a combination of reflective, refractive and holographic optic beam directing elements. The function of the lens 121, in various embodiments, can be accomplished with a refractive, diffractive or holographic lens element.

The emitter array may be used with or without light collection optics on each microLED. The emitter array may be used with or without subsequent magnifying optics to reduce the angular range of light from the emitter elements.

Figure 4:
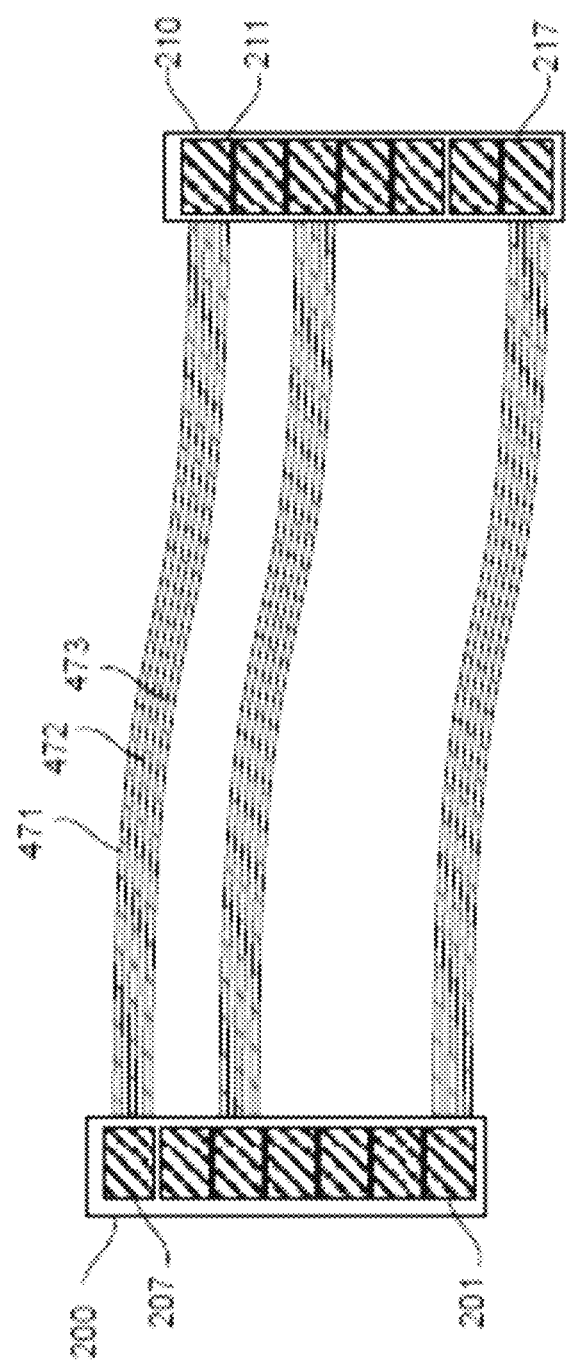
FIG. 4 shows one embodiment of optical transmission channels.

FIG. 4 shows one embodiment of optical transmission channels. The optical transmission channels carry light from optical channel inputs 200 to optical channel outputs 210. In some embodiments, a multicore fiber, or a coherent fiber bundle, carries light from all the input optical channels to the output outputs. The number of fiber cores need not match the number of optical channels; in a coherent fiber bundle, the light from each input optical channel is carried in multiple cores. FIG. 4 shows 3 light guides 471, 472 and 473 carrying light from an optical channel input 207 of the optical transmission channels to an optical channel output 217 of the optical transmission channels and from optical channel input 201 of the optical transmission channels to optical channel output 211 of the optical transmission channels. Light guides, 471, 472 and 473 are individual cores in a coherent fiber bundle in some embodiments, or they could be the cores in a multicore fiber in other embodiments.

For some applications it may be preferable for the light guide to be flexible, for example to allow for attachment to optical channel outputs that may be some distance away from the optical channel inputs and may have to accommodate relative position movement due to vibration and thermal expansion. In some embodiments the light guide may be rigid, for example in environments where the movement of the optical channel outputs is small.

Figure 5:
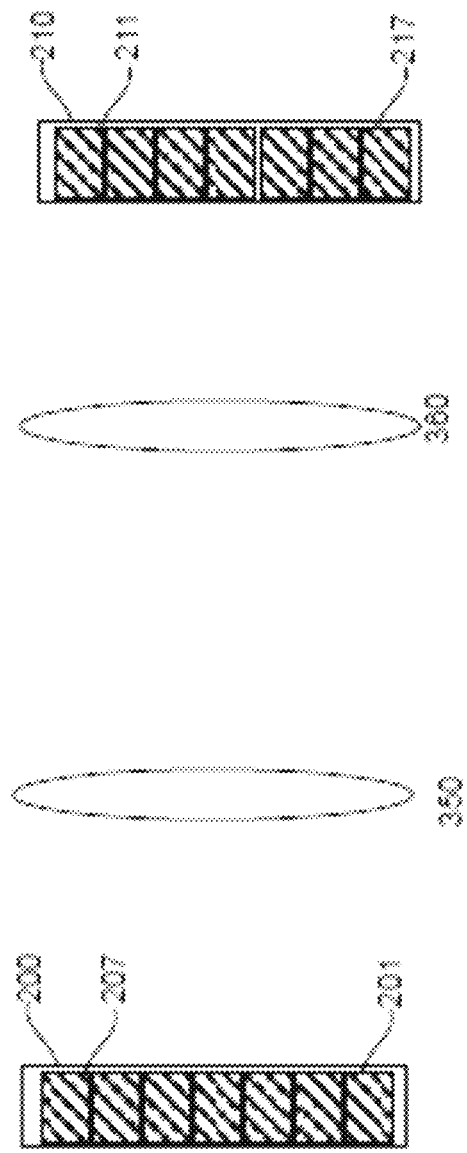
FIG. 5 shows a "4f" relay system.

In some embodiments the relay of the light from the optical channel inputs to the optical channel outputs is performed by a relay lens, or by a train of relay lenses, for example as is typically done in a periscope or borescope. A "4f" relay system is shown in FIG. 5. The optical system creates an inverted image of the optical channel inputs 200 onto the optical channel outputs 210. A flexible image relay system such as that in U.S. Pat. No. 5,309,541, incorporated by reference herein, would provide a means of relaying the light that can accommodate relative position movement due to vibration and thermal expansion.

Figure 6:
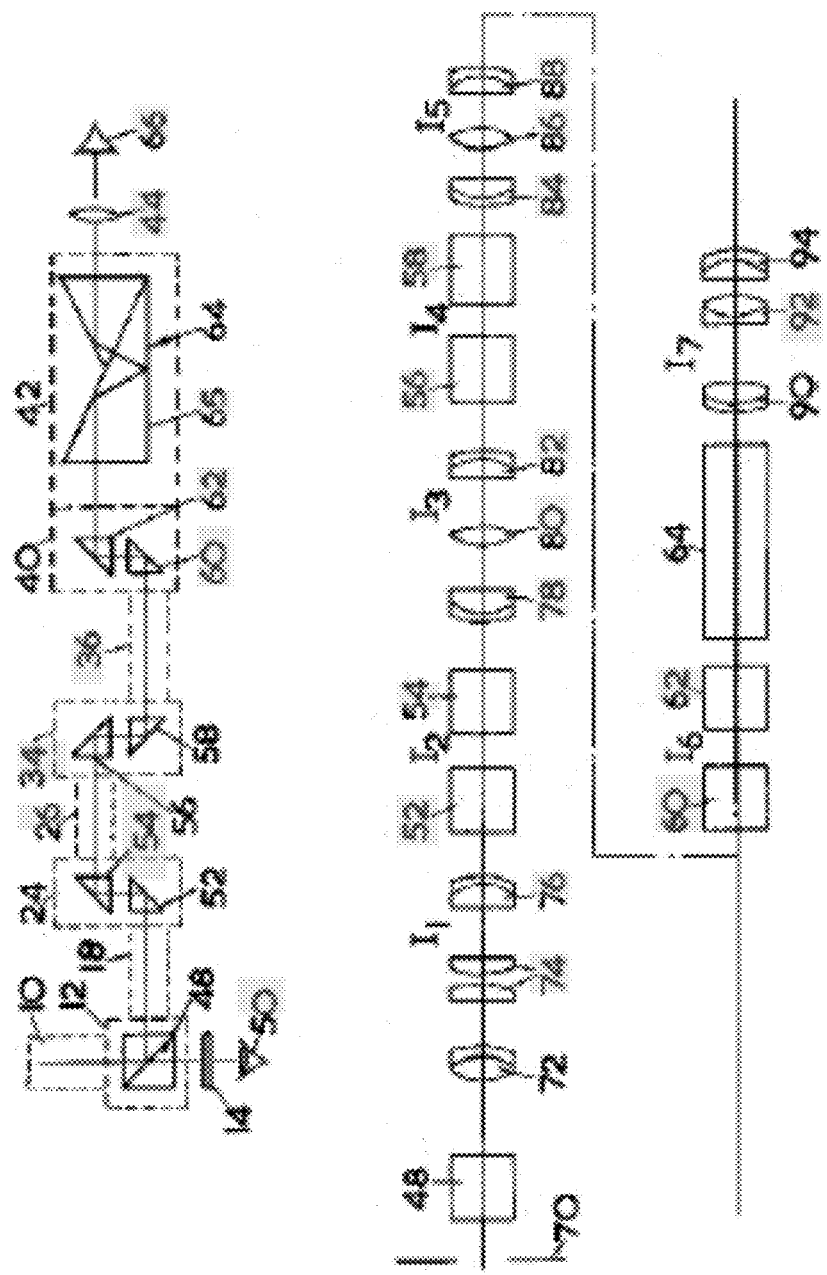
FIG. 6 shows a prior art system that allows for pivoting the optical train around a corner using turning prisms.

In some embodiments an image relay system that turns sharp corners may be used for the optical channel. Such a system may be useful to accommodate size and orientation constraints. An articulated image relay such as described in U.S. Pat. No. 3,994,557, incorporated by reference herein, allows the light to turn corners and allows for relative position movement due to vibration and thermal expansion. For example, the system of FIG. 6 allows for pivoting the optical train around the corner turning prisms 52,54 56 and 58 and again at corner turning prisms 60 and 62. Some embodiments utilize an image rotator such as a dove prism 64 to adjust the angle of the image on the detector array. Instead of rotating the image with the dove prism, the received signals could be adapted to a different output through electronic switching after optoelectronic conversion.

In some embodiments one or more optical elements in an imaging system is moved to keep the image of the source steady on the receiver, for example as may be found in motion compensation systems routinely used in photographic camera lenses.

Free-space optic signals have an advantage over both enclosed guided wave optics and electronic signal transmission in that free-space optical signals generally can pass through each other. This advantage may allow for systems with more and denser interconnections. Borescopes and periscopes typically relay light in a closed tube system to keep out surrounding fluids. This closed tube system is often opaque, which does not allow the relayed signals in two different systems to pass through each other.

In order to allow the relayed images to pass through each other in our system, in some embodiments, therefore, the relay optics could be mounted in a cage, or supported on a substrate with no tube. Alternatively, in some embodiments the image relay lenses of the first image relay system could be held in a transparent tube with a rectangular cross section. This would allow a second image relay system to cross this first system laterally without significant distortion. In some embodiments a cross point tube section is utilized, for example to allow the signals in two intersecting tubes to pass through each other.

In some embodiments, a solid optical medium of one optical index of refraction carries the light between lenses of a second optical index of refraction and the lenses are held by the solid itself.

In some embodiments the optical channel passes through an intermediate substrate (e.g. a PCB or interposer) that carries power and electrical signal traces. In some embodiments a hole or a transparent window in the intermediate substrate allows the light in the optical channel to pass through the intermediate substrate.

The optical channel outputs may be butt coupled directly to the optoelectronic receivers.

Figure 7:
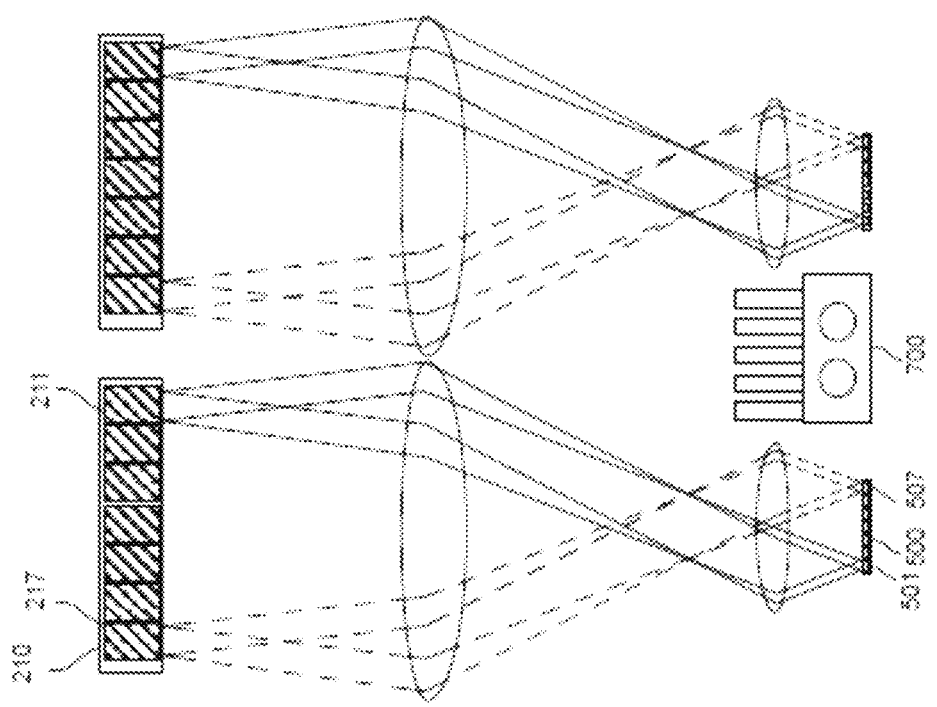
FIG. 7 shows an optical channel output coupled to an optoelectronic receiver through a demagnification system.

Alternatively, it may be advantageous to provide a demagnification system, analogous to the systems shown in FIG. 1 and FIG. 2. One of these, shown in FIG. 7, shows the optical channel output 211 coupled to an optoelectronic receiver 501, through a demagnification system.

It may be preferable to include demagnification at the receiver since typical optoelectronic detectors can receive over a larger angular range than the optical channel. It may also be beneficial to include demagnification to allow room for additional structures such as a heat sink 700, as shown in FIG. 7, between two demagnification systems. A heat sink in such a system may include fins, heat pipes, circulating fluid, or other means of conducting heat away from the system.

In some embodiments the various arrangements including microLEDs is used in systems providing optical communications between chips and/or chiplets. In some embodiments, for example, the arrangements may be utilized in conjunction with an integrated circuit (IC).

Figure 8:
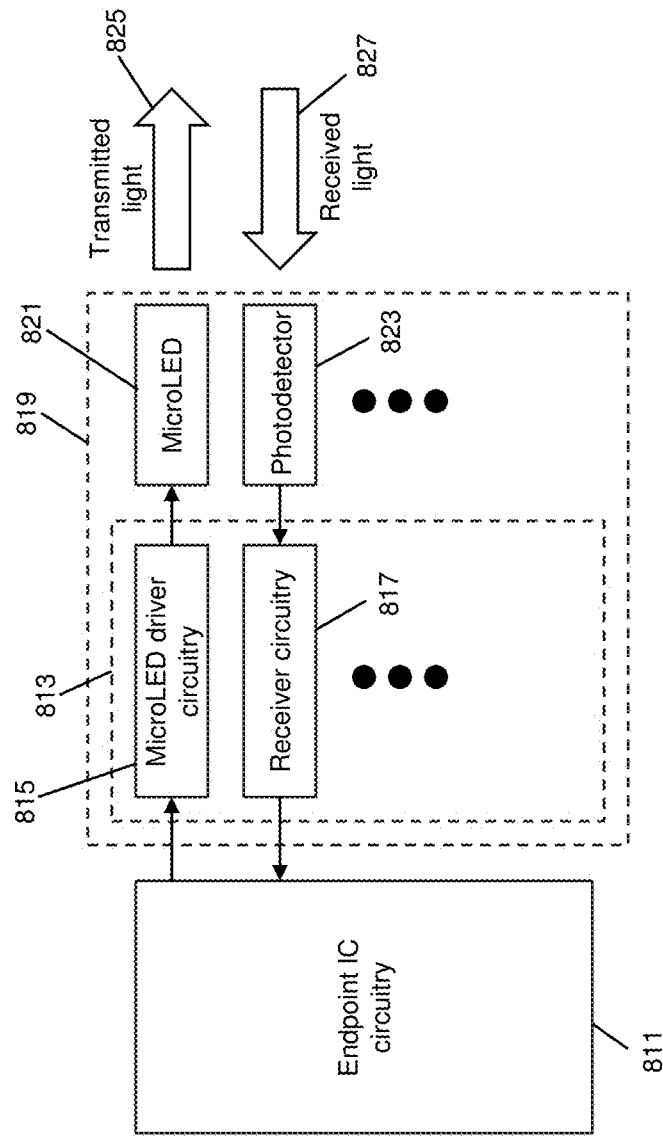
FIG. 8 is a block diagram showing an electrical architecture of a first optically-interconnected IC.

FIG. 8 is a block diagram showing an electrical architecture including a first optically-interconnected IC. The IC includes IC circuitry 811 for performing logic and/or other functions. Transceiver circuitry 813 is coupled to the IC circuitry. The transceiver circuitry comprises, and in some embodiments consists of, an array of microLED driver circuitry 815 and an array of receiver circuitry 817. The transceiver circuitry is part of a transceiver subsystem 819.

The transceiver subsystem also includes an array of microLEDs 821 and photodetectors 823. In some embodiments the transceiver circuitry may be monolithically integrated into the same IC containing the endpoint IC circuitry. In some embodiments the transceiver circuitry or may be contained in one or more separate transceiver ICs. The microLED driver circuitry drives the array of microLEDs to emit light 825 to carry information provided to the driver circuitry from the endpoint IC circuitry. An N-bit wide unidirectional parallel bus connection may be implemented with N optical links from the transceiver subsystem to a second IC (not shown in FIG. 8), or, in some embodiments, a plurality of second ICs. A corresponding unidirectional parallel bus may be implemented by adding N additional optical links from the transceiver subsystem of the second IC to the transceiver subsystem of the first IC. The photodetectors receive light 827 from the corresponding parallel bus, the light carrying information from the second IC. The photodetectors provide electrical signals carrying the received information to the receiver circuitry, which processes the signals and provides the information to the endpoint IC circuitry.

An N-bit wide unidirectional parallel bus connection is implemented with N optical links from the transceiver subsystem to a second IC, or, in some embodiments, a plurality of second ICs. The second IC generally has an associated second transceiver subsystem. Light from the microLEDs may be coupled to the optical links as discussed herein. A corresponding unidirectional parallel bus is implemented by adding N additional optical links from the transceiver subsystem of the second IC to the transceiver subsystem of the first IC. The photodetectors receive light from the corresponding parallel bus, the light carrying information from the second IC. The photodetectors provide electrical signals carrying the received information to the receiver circuitry, which processes the signals and provides the information to the endpoint IC circuitry.

In some embodiments the second IC is on a same substrate as the first IC. In some embodiments the second IC is in a same semiconductor package as the first IC. In some embodiments the second IC and the first IC are part of a same multi-chip module (MCM).

The optoelectronic (OE) devices, for example the microLEDs and photodetectors, may include structures that enhance optical coupling efficiency. For instance, microLEDs may include various structures that improve the light extract efficiency (LEE), including surface roughening, particular LED shapes, and encapsulation in high-index materials. They may also include structures such mirrors and lenses that collect the light from the LED's large intrinsic emission solid angle into a smaller solid angle that is better matched to the numerical aperture of the rest of the optical link, for example as discussed herein.

Although the invention has been discussed with respect to various embodiments, it should be recognized that the invention comprises the novel and non-obvious claims supported by this disclosure.

What is claimed is:

1. Optical communication apparatus for an optically interconnected integrated circuit which includes circuitry for performing logic functions, comprising:
an array of microLEDs;
optical transmission channels, comprising a multicore fiber, to receive light from the array of microLEDs at optical transmission channel inputs and output light at optical transmission channel outputs, wherein a number of cores in the multicore fiber is different than a number of microLEDs in the array of microLEDs, wherein each optical transmission channel comprises multiple cores of the multicore fiber that are made from a rigid material, and wherein each microLED in the array of microLEDs is configured to produce light to be carried in a plurality of cores of the multiple cores of the multicore fiber in the optical transmission channels;

optical elements, including at least one lens, between the array of microLEDs and the optical transmission channel inputs to magnify and focus light from the array of microLEDs onto the optical transmission channel inputs; and an array of optoelectronic receivers, wherein each optoelectronic receiver is optically coupled to receive light from one optical transmission channel output of the optical transmission channels.

2. The optical communication apparatus of claim 1, wherein the optical elements include a first lens to collimate light from the array of microLEDs and a second lens to focus the collimated light onto the optical transmission channel inputs, the second lens having a longer focal length than the first lens.

3. The optical communication apparatus of claim 2, further comprising a planar mirror optically between the first lens and the second lens.

4. The optical communication apparatus of claim 1, wherein the optical elements include a first lens to collimate light from the array of microLEDs and a curved folding mirror to focus the collimated light onto the optical transmission channel inputs and fold the light by ninety degrees.

5. The optical communication apparatus of claim 1, further comprising a reflector for each microLED in the array of microLEDs to direct light to the optical elements.

* * * * *